(12) United States Patent
Schötz

(10) Patent No.: US 7,296,542 B2
(45) Date of Patent: Nov. 20, 2007

(54) DEVICE FOR INTRODUCING HOT GAS INTO A HEATING SURFACE PIPE OF A WASTE HEAT BOILER

(75) Inventor: Michael Schötz, Leverkusen (DE)

(73) Assignee: ALSTOM Power Energy Recovery GmbH, Kassel (DE)

( * ) Notice: Subject to any disclaimer, the term of this patent is extended or adjusted under 35 U.S.C. 154(b) by 221 days.

(21) Appl. No.: 11/042,566

(22) Filed: Jan. 25, 2005

(65) Prior Publication Data

US 2006/0048725 A1 Mar. 9, 2006

(30) Foreign Application Priority Data

Jan. 30, 2004 (DE) .................... 10 2004 004 999

(51) Int. Cl.
*F22B 37/36* (2006.01)

(52) U.S. Cl. ..................................... 122/7 R; 122/494

(58) Field of Classification Search ................. 122/7 R, 122/494

See application file for complete search history.

(56) References Cited

U.S. PATENT DOCUMENTS

| | | | |
|---|---|---|---|
| 4,445,463 A | 5/1984 | Casper et al. | ................ 122/7 R |
| 6,880,492 B2 * | 4/2005 | Gottschalk et al. | ......... 122/7 R |

FOREIGN PATENT DOCUMENTS

| | | |
|---|---|---|
| CH | 370810 | 3/1959 |
| DE | 17 51 085 | 7/1970 |
| DE | 198 22 546 C 1 | 5/1998 |

OTHER PUBLICATIONS

German Search Report dated Jul. 2, 2004.
European Search Report EP 05 00 1379, dated Apr. 25, 2005.

\* cited by examiner

*Primary Examiner*—Gregory Wilson
(74) *Attorney, Agent, or Firm*—Alix, Yale & Ristas, LLP

(57) ABSTRACT

A device for introducing hot gas into a heating surface tube of a waste heat boiler having an outer tube connected to the boiler wall, in particular to the tube plate, has an inner or inlet tube that is connected to the outer tube by a rounded reversing cap to form an inlet port for the hot gas. The inner tube is surrounded by the outer tube at a distance and has an inflow section and an outflow section connected to the heating surface tube. The device further has a coolant transport tube, between the outer tube and the inner tube, that extends to the vicinity of the reversing cap. The inflow section and at least part of the outflow section of the inlet tube are conical in design, where the taper is less than 2° and the cross-section of the conical region of the inlet tube becomes smaller as it approaches the outflow section. The length of the conical region is at least four times the inner diameter of the inlet tube, and the conical region of the inlet tube is designed with at least two different tapers.

10 Claims, 2 Drawing Sheets

DEVICE FOR INTRODUCING HOT GAS INTO A HEATING SURFACE PIPE OF A WASTE HEAT BOILER

BACKGROUND OF THE INVENTION

This invention relates generally to waste heat boilers. More particularly, the present invention relates to apparatus for introducing hot gas into a heating surface tube of a waste heat boiler having an outer tube connected to the boiler wall, in particular to the tube plate, and having an inner or inlet tube that is connected to the outer tube by means of a rounded reversing cap to form an inlet port for the hot gas, which inner tube is surrounded by the outer tube at a distance and has an inflow section and an outflow section connected to the heating surface tube, and further having a coolant transport tube that is arranged between the outer tube and the inner tube and extends to the vicinity of the reversing cap.

In waste heat boilers or heat exchangers, hot gases (such as synthesis gases from partial oxidation systems) are cooled by coolants, in most cases generating steam in the process. The heat exchangers preferably consist of a plurality of straight, curved or helical heating surface systems that are connected to each other in parallel and that are composed of a plurality of heating surface tubes.

In waste heat boilers or heat exchangers designed with devices of this generic type for introducing hot gas into their heating surface tubes, it has become apparent that the geometric construction of the gas inlet is unfavorably designed with regard to real and potential corrosive attack and also with regard to the tendency of the gas inlet to clog during operation. Particularly the region of the transition from the conical inner or inlet tube to the subsequent straight or cylindrical inlet tube is subject to these problems. It has become apparent that the mechanisms described result in an extremely short service life of the components, brought about by a combined erosion and corrosion process, for example.

An apparatus of the generic type is known from the publication "Verfahrenstechnik: Anlagen-und Apparatebau, Komponenten und Teilkreisläufe" [Process Engineering: System and Apparatus Design, Components and Subcircuits] (1986), page 19, published by the firm of L. & C. Steinmüller. This known apparatus has an inlet or inner tube that narrows conically at a scanty 10° to the subsequent cylindrical innertube.

Additional generic devices for introducing hot gas into a heating surface tube of a waste gas boiler are known from the documents DE 198 22 546 C1 and DE 101 38 626 A1. The generic devices disclosed by these documents also have a conically narrowing inflow section and a straight cylindrical inflow section of the inlet or inner tube.

SUMMARY OF THE INVENTION

The object of the present invention is to provide an apparatus for introducing hot gas into a heating surface tube of a waste heat boiler that avoids the aforesaid disadvantages. In particular, an apparatus is to be created that permits:
- critical components to be designed with optimized flow with regard to corrosion mechanisms, so that surface temperatures can be reduced, thus avoiding corrosion attack
- critical components to be designed with optimized flow with regard to the tendency to clog, so that the risk of clogging can be reduced.

Through the solution proposed in the invention, an apparatus for introducing hot gas into a heating surface tube of a waste heat boiler is created that has the following advantages:
- The technically unfavorable transition from a cone to a cylinder within the inlet tube is avoided, or is shifted to a region within the inlet tube where the hot gas has already cooled substantially, and thus the tendency for corrosion and clogging is significantly reduced.
- The service life of the corresponding components is lengthened.
- The possibility of erosion is reduced.
- Through the use of two or more tapers, it is possible to manage the flow area requirements of the gas that is to be or has been cooled in the conical region in a far more differentiated way.

In an especially preferred embodiment of the invention, the angle of the cone or cones of the conically shaped inlet or inner tube is less than 1°. This allows the aforementioned advantageous characteristics of the present invention to be optimized still further.

When the conical region of the inlet tube is designed with two or more tapers, i.e. angles, it is preferred for the region that the flow first passes through, or the upstream region, to have a smaller taper than the region that the flow next passes through, or the downstream region. This measure makes it possible to influence or reduce the tendency for corrosion and clogging very substantially, since the hot gas can first be cooled significantly in a section with small taper, yet the flow velocity of the gas is further accelerated as compared to a strictly cylindrical inlet tube, thus heightening the self-cleaning effect in the inlet tube.

In a useful embodiment of the invention, the remaining part of the inlet tube's outflow section is designed as a cylinder or straight cylinder. This arrangement is beneficial from a manufacturing perspective.

It is advantageous for the gas inlet port of the inlet tube to be flared in a torus or trumpet shape in order to increase the efficiency with which the gas enters the apparatus.

As a result of the advantageous embodiment of the gas-side wall surface of the reversing cap and the gas-side wall surface of the inflow section and/or outflow section of the inlet tube with a wear-resistant and corrosion-resistant ceramic coating or diffusion coating or cladding, for example a weld-deposited cladding, the service life or durability of the heating surface tubes can be significantly lengthened even further.

In a preferred embodiment of the invention, the reversing cap and/or the inlet tube is made of a forged or cast piece. As a result of this measure, manufacture is simplified significantly as compared to the conventional component, and consequently component costs are reduced.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
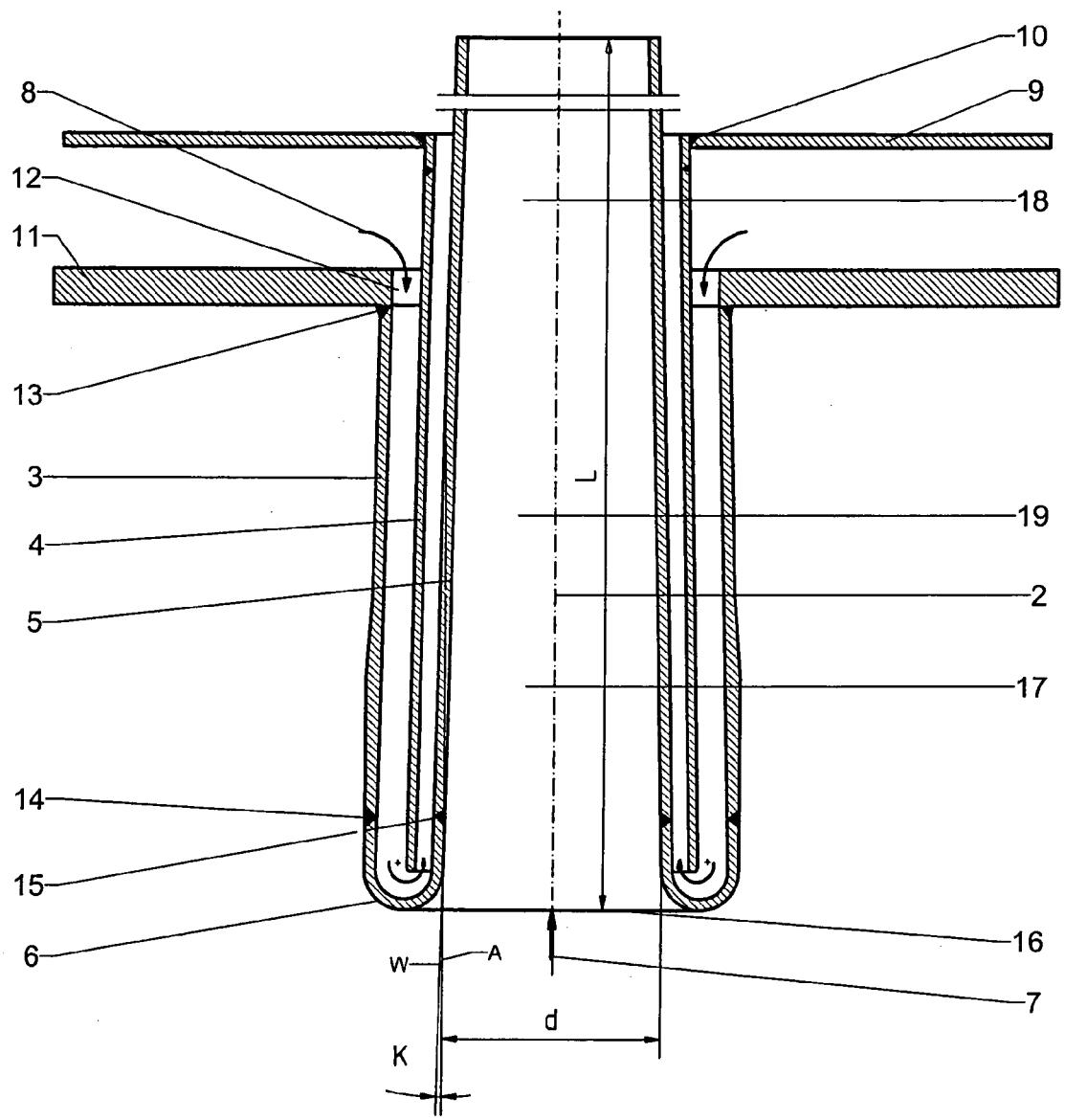
FIG. 1 is a vertical cross-section of a device in accordance with the invention.

As in the figure in the cited publication, page 19, in FIG. 1 of the waste heat boiler that is represented here, only a part of the vessel wall, namely the tube plate 11, is shown. This part is connected in the area of hole 12 to an apparatus 1 for the entry of the hot gas 7 into a heating surface tube (not shown) of the waste heat boiler by means of a weld 13. An outer tube 3 and an inner or inlet tube 5 that is surrounded by the outer tube 3 are part of the apparatus 1 and are connected to each other by means of a rounded reversing cap 6. In the embodiment shown in FIG. 1, the reversing cap—which causes the coolant 8 to reverse the direction of flow within the apparatus 1, essentially by 180°—takes the form of a part that is located in the reversing area of the apparatus 1 and is connected to the outer tube 3 by means of a weld 14 and to the inner tube 5 by means of a weld 15. The reversing cap 6 defines a gas inlet port 16 into the inner or inlet tube 5. Downstream of the gas inlet port 16, the inner or inlet tube 5 has an inflow section 17, which transitions into an outflow section 18 that is connected to the heating surface tube and through which the hot gas 7 flows. The spatial extent or arrangement of the apparatus 1 for the entry of hot gas 7 into a heating surface tube of a waste heat boiler in the longitudinal direction 2 is defined in that the apparatus 1 extends upstream of the heating surface tube (not shown) with regard to the direction of flow of the hot gas 7.

Located between the outer tube 3 and the inner tube 5 is a coolant transport tube 4, one end of which is connected as shown in this embodiment by means of a connection 10, which may be a weld as shown in FIG. 1, to the intermediate tube plate 9 that is connected to the container wall of the waste heat boiler, and whose free end terminates in the reversing area of the reversing cap 6.

According to the invention, the apparatus 1 for introducing hot gas into a heating surface tube of a waste heat boiler is designed such that the inflow section 17 and at least part of the outflow section 18 of the inlet tube 5 is conical in design, wherein the taper of the conical region 19 is less than 2° and the cross-section of the conical region 19 of the inlet tube 5 becomes smaller from the inflow section 17 toward the outflow section 18 (i.e. the cross-section of the outflow section 18 is smaller than the cross-section of the inflow section 17), and the length L of the conical region 19 is at least four times the inner diameter d of the inlet tube 5, and the conical region 19 of the inlet tube 5 is designed with at least two different tapers, which is to say with at least two different angles. Taper is understood as the angle K that is formed between the conical tube wall W and the parallel axis A (see FIG. 1). This embodiment of the apparatus 1 according to the invention achieves, firstly, that the technically unfavorable transition from cone to cylinder within the inlet tube 5 is avoided, or displaced to a region inside the inlet tube 5 where the hot gas 7 has already cooled considerably, with the result that the tendency for corrosion and clogging is reduced significantly. In addition, said transition is evened out to an extraordinarily great extent as compared to prior art solutions, thus significantly reducing the possibility of erosion. In consequence of the aforesaid advantages, moreover, increased service life of the corresponding components may be achieved.

Figure 2:
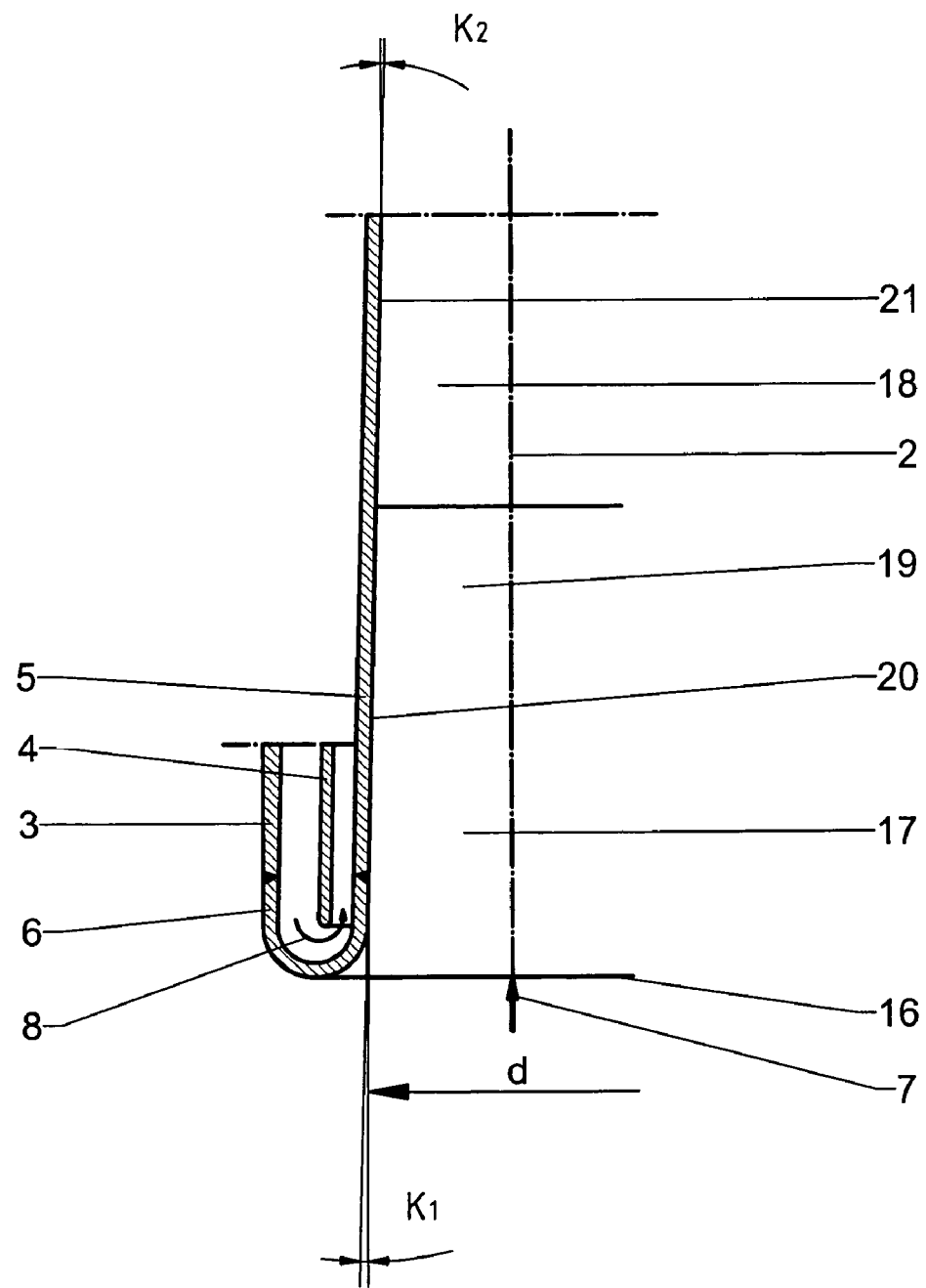
FIG. 2 is a vertical cross-section of an alternate embodiment of the inlet tube of the device of FIG. 1.

If the apparatus 1 according to the invention has two tapers, for example, a preferred embodiment of the invention provides for the first taper—viewed from the gas flow side—or the upstream region 20 of the conical region 19 to have an angle K of 0.75°, for example, and the second taper or the downstream region 21 of the conical region 19 to have an angle K of 1.5°, for example (see FIG. 2). In such an arrangement, the tendency for corrosion and blockage can be influenced or reduced very significantly, since the hot gas can first be cooled substantially in a section with very small taper before it reaches, in cooled form, a region with relatively greater taper.

The aforementioned advantages can be further optimized in that the conical region 19 of the inlet tube 5 is designed with a taper (angle K) of less than 1°.

The rest or remaining part of the outflow section 18 of the inlet tube 5 is preferably designed as a cylinder or straight cylinder to permit a simple transition to the heating surface tube (not shown).

An alternative, advantageous embodiment of the invention provides for the gas-side wall surface of the reversing cap 6, the gas-side wall surface of the inflow section 17 and/or outflow section 18 of the inlet tube 5 to be designed with a wear-resistant and corrosion-resistant ceramic coating or a diffusion coating, for example aluminum diffusion, or a cladding, for example weld-deposited cladding (not shown). The corrosion-resistance and erosion-resistance of the reversing cap 6 and inlet tube 5 can be further optimized by this means.

In addition, it can be beneficial to design the reversing cap 6 and/or the inlet tube 5 in a forged or cast construction.

In contrast to the drawing shown in FIG. 1, the gas inlet port 16 can also be flared in a torus or trumpet shape in order to increase the efficiency with which the gas enters the apparatus 1.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An apparatus for introducing hot gas into a heating surface tube of a waste heat boiler, the waste heat boiler also having a tube plate, the apparatus comprising:
    an outer tube connected to the tube plate;
    an inner tube disposed within the outer tube and spaced at a distance therefrom, the inner tube having an inner diameter, an inflow section, and an outflow section connected to the heating surface tube, the inflow section and at least part of the outflow section defining a conical region, the conical region having a conical-shape with a taper of less than 2°, a cross-section that becomes smaller from the inflow section to the outflow section, a length that is at least four times the inner diameter of the inner tube, and at least two different tapers;
    a rounded reversing cap connecting the inner tube to the outer tube, the reversing cap defining a gas inlet port for the hot gas; and
    a coolant transport tube disposed between the outer tube and the inner tube, the coolant transport tube extending to a distal end disposed proximate to the reversing cap.

2. The apparatus of claim 1 wherein the taper is less than 1°.

3. The apparatus of claim 1 wherein the conical region of the inlet tube, viewed in the direction of the flow of the hot gas, has a smaller taper in the upstream region than in the downstream region.

4. The apparatus of claim 1 wherein a part of the outflow section that is not in the conical region is cylindrical.

5. The apparatus of claim 1 wherein the gas inlet port is flared in a torus or trumpet shape.

6. The apparatus claim 1 wherein the reversing cap and the inflow section of the inner tube each have a gas-side wall surface having a wear-resistant and corrosion-resistant ceramic coating, or a diffusion coating, or a cladding.

7. The apparatus claim 1 wherein the reversing cap and the inflow and outflow sections of the inner tube each have a gas-side wall surface having a wear-resistant and corrosion-resistant ceramic coating, or a diffusion coating, or a cladding.

8. The apparatus of claim 1 wherein the reversing cap or the inlet tube is a forged or cast construction.

9. The apparatus of claim 1 wherein the reversing cap and the inlet tube are a forged or cast construction.

10. An apparatus for introducing hot gas into a heating surface tube of a waste heat boiler, the waste heat boiler also having a tube plate, the apparatus comprising:

an outer tube connected to the tube plate;

an inner tube disposed within the outer tube and spaced at a distance therefrom, the inner tube having an inner diameter, an inflow section, and an outflow section connected to the heating surface tube, the inflow section and the outflow section defining a conical region, the conical region having a conical-shape with a taper of less than 2°, a cross-section that becomes smaller from the inflow section to the outflow section, a length that is at least four times the inner diameter of the inner tube, and at least two different tapers;

a rounded reversing cap connecting the inner tube to the outer tube, the reversing cap defining a gas inlet port for the hot gas; and a coolant transport tube disposed between the outer tube and the inner tube, the coolant transport tube extending to a distal end disposed proximate to the reversing cap.

* * * * *